Inventor.
George W. McKinstry
By Horatio E. Bellows
Attorney.

UNITED STATES PATENT OFFICE.

GEORGE W. McKINSTRY, OF SOUTHBRIDGE, MASSACHUSETTS, ASSIGNOR TO BAY STATE OPTICAL COMPANY, A CORPORATION OF MAINE.

OPHTHALMIC MOUNTING.

1,317,207. Specification of Letters Patent. Patented Sept. 30, 1919.

Application filed July 25, 1919. Serial No. 313,181.

*To all whom it may concern:*

Be it known that I, GEORGE W. McKINSTRY, a citizen of the United States, residing at Southbridge, in the county of Worcester and State of Massachusetts, have invented certain and useful Improvements in Ophthalmic Mountings, of which the following is a specification.

My invention relates to the mountings of spectacles and eyeglasses, and particularly to nonmetallic frames for carrying circular lenses.

Circular lenses of the cylindrical type, or " cylindrical lenses " so called, have axes, wherefore any accidental rotary movement thereof in the frame causes imperfect vision. For this reason it is customary to lock the lens against rotary movement. Circular lenses of the spherical type, known as " spherical lenses " have no axis, hence any rotation thereof does not derange the vision.

An object of my invention is to provide a mounting or frame which the retail optician may use with either a cylindrical or spherical lens. In other words a mounting which is operative to lock a cylindrical lens, and yet equally capable of holding a spherical lens firmly in its seat; thereby avoiding the time, trouble and expense involved in locating and producing a notch in all the lenses introduced into the frame. Another object is to enable a repeated use of either type of lens without manual manipulation of the locking means. Further objects are structural strength and inexpensiveness.

To the above ends essentially my invention consists in such parts and in such combinations of parts as fall within the scope of the appended claims.

Figure 1:
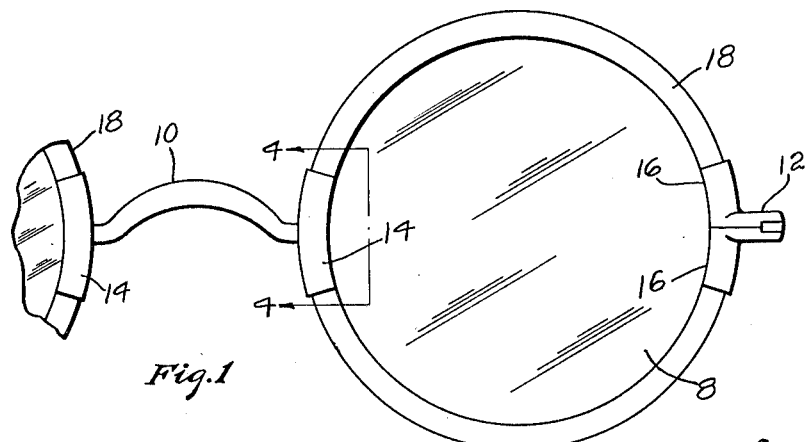

In the accompanying drawings which form a part of this specification,

Figure 1 is a front elevation of a portion of a pair of spectacles or eyeglasses embodying my invention.

Figure 2:
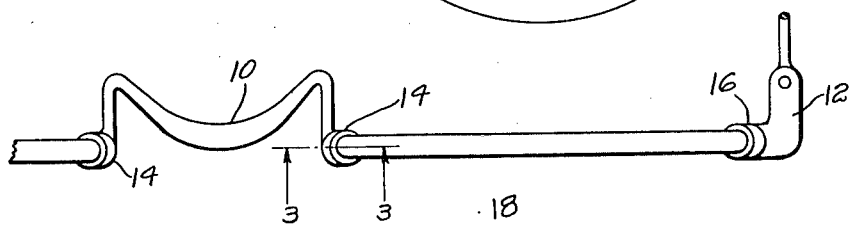
Figures 3, 4, 5:
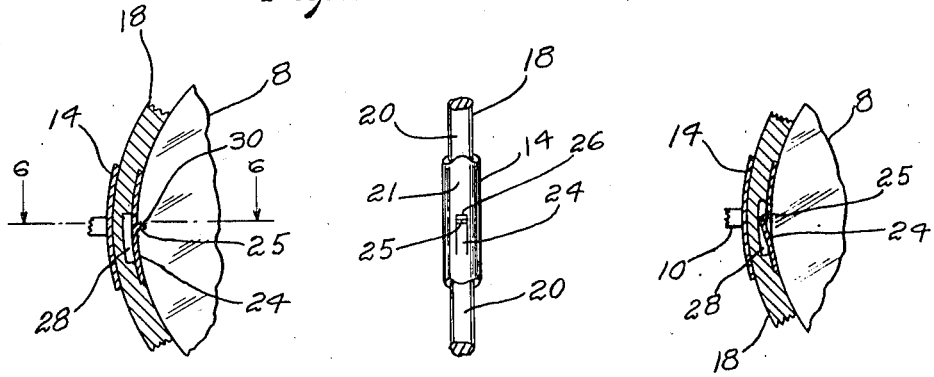
Figure 6:
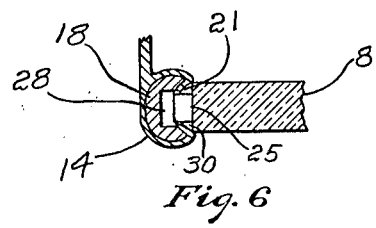

Fig. 2, a plan of the same,

Fig. 3, a section on line 3—3 of Fig. 2,

Fig. 4 is a section of the frame with the lens removed, taken on line 4—4 of Fig. 1, Fig. 5, a section corresponding to that of Fig. 3 showing the parts in another position, and Fig. 6, a section on line 6—6 of Fig. 3.

Like reference characters indicate like parts throughout the views.

In the drawings 8 are the circular lenses, 10 the bridge, and 12 the end pieces of a frame of the nonmetallic type wherein metallic sleeves or straps 14 are attached to or integral with the bridge, and sleeves or straps 16 are similarly connected with the end pieces. The straps 14 and 16 constitute the rim mountings. The rims 18 of zylonite or other such material are in this instance provided with the usual internal annular grooves 20 and the inner sides of the rim mounting members 14 and 16, which tightly embrace the rims, are also provided with longitudinally disposed concave portions 21 which conform to and are seated in the grooves. One of the sleeves 14 or 16, in this case the sleeve 14, has the material of its inner or concave wall cut at an intermediate point to form a longitudinally disposed flexible tongue 24 with an outwardly inclined lip 25 upon its free end. The tongue which is movable in the resultant slot 26 is normally in the longitudinal plane of the sleeve while its lip or tooth 25 projects exteriorly therefrom. To allow ample space for rearward movement of the tongue there is formed a longitudinally disposed opening or recess 28 in the adjacent portion of the rim.

In Fig. 3 the lens 8 is shown provided with a transversely disposed rectangular peripheral notch or cavity 30 to coöperate with the projection 25 to lock the lens against rotary movement. The lip is maintained in the cavity by the resilient tongue 24. The notch is required only when the circular lens 8 is of the cylindrical type.

In Fig. 5 the lens is represented as of the spherical type and is therefore unnotched. In this case the tongue 24 is pressed rearwardly into the slot 28 and the projection 25 presses against the periphery of the lens.

It will be observed that my locking means is adapted without modification to use both with cylindrical and spherical lenses and that a cylindrical lens may later be used in a rim formerly occupied by a spherical lens because the locking member being resilient yields and is not bent by the insertion of the original spherical lens.

I claim:—

1. In eyeglasses or spectacles, circular rims, sleeves embracing the rims, resilient tongues on the sleeves, and projections on the tongues disposed at an angle thereto, adapted to engage lenses.

2. In eyeglasses or spectacles, nonmetallic circular rims provided with recesses, sleeves embracing the rims, vibratory tongues on the sleeves movable in the recesses, and projections on the end of the tongues adapted to engage lenses.

3. In eyeglasses or spectacles, nonmetallic circular rims provided with recesses, metallic sleeves embracing the rims over the recesses, vibratory tongues integral with the sleeves and forming a constituent part thereof movable in the recesses, and lateral projections on the ends of the tongues adapted to engage lenses.

4. In eyeglasses or spectacles, circular nonmetallic rims provided with internal annular grooves and with recesses, sleeves embracing the rims comprising transversely concave portions on the rims over the recesses and provided with longitudinally disposed slots, vibratory tongues integral with the sleeves in the slots and movable in the recesses, and projections on the tongues within the concave portions adapted to engage lenses.

In testimony whereof I have affixed my signature.

GEORGE W. McKINSTRY.